US011079761B2

(12) United States Patent
Nath

(10) Patent No.: US 11,079,761 B2
(45) Date of Patent: Aug. 3, 2021

(54) VEHICLE PATH PROCESSING

(71) Applicant: Ford Global Technologies, LLC, Dearborn, MI (US)

(72) Inventor: Nitendra Nath, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 316 days.

(21) Appl. No.: 16/217,227

(22) Filed: Dec. 12, 2018

(65) Prior Publication Data

US 2020/0192383 A1    Jun. 18, 2020

(51) Int. Cl.
  *G05D 1/02*   (2020.01)
  *G05D 1/00*   (2006.01)
  *B62D 6/00*   (2006.01)

(52) U.S. Cl.
  CPC ............. *G05D 1/0212* (2013.01); *B62D 6/00* (2013.01); *G05D 1/0088* (2013.01); *G05D 1/027* (2013.01); *G05D 1/0278* (2013.01); *G05D 2201/0213* (2013.01)

(58) Field of Classification Search
  CPC ...... B62D 15/025; B62D 6/00; G05D 1/0088; G05D 1/0212; G05D 1/027; G05D 1/0278; G05D 2201/0213; B60W 60/0013; B60W 60/0016
  See application file for complete search history.

(56) References Cited

U.S. PATENT DOCUMENTS

| | | | | |
|---|---|---|---|---|
| 5,483,457 A * | 1/1996 | Shibata | ................... | G01C 21/28 701/472 |
| 5,680,313 A * | 10/1997 | Whittaker | .............. | G05D 1/024 701/300 |
| 5,902,349 A * | 5/1999 | Endo | ................... | G01C 21/3415 340/990 |
| 6,169,940 B1 * | 1/2001 | Jitsukata | ................... | B62D 1/28 340/903 |
| 6,405,132 B1 * | 6/2002 | Breed | ................... | G01S 7/4802 701/301 |
| 6,675,094 B2 | 1/2004 | Russell et al. | | |
| 6,963,795 B2 * | 11/2005 | Haissig | ................ | G08G 5/0008 342/104 |
| 8,170,739 B2 * | 5/2012 | Lee | ................... | B62D 15/0255 701/25 |
| 8,825,265 B1 * | 9/2014 | Ferguson | ............. | G05D 1/0287 701/26 |
| 8,880,272 B1 * | 11/2014 | Ferguson | .............. | B60W 10/20 701/26 |

(Continued)

FOREIGN PATENT DOCUMENTS

| | | |
|---|---|---|
| EP | 2081169 A1 | 7/2009 |
| JP | 2006126990 A | 5/2006 |
| WO | 2018097026 A1 | 5/2018 |

*Primary Examiner* — Angelina Shudy
(74) *Attorney, Agent, or Firm* — Frank A. MacKenzie; Bejin Bieneman PLC

(57) ABSTRACT

A system, comprising a computer that includes a processor and a memory, the memory storing instructions executable by the processor to estimate path coefficients based on a difference between a vehicle location and a vehicle path. Estimating the path coefficients can include minimizing the difference while controlling path coefficient gain to maintain occupant comfort and safety. A vehicle can be operated based on the estimated path coefficients.

20 Claims, 10 Drawing Sheets

(56) References Cited

U.S. PATENT DOCUMENTS

| | | | |
|---|---|---|---|
| 8,914,213 B2* | 12/2014 | Chimner | B60W 30/02 |
| | | | 701/73 |
| 9,567,004 B1 | 2/2017 | Jhang et al. | |
| 9,598,071 B2* | 3/2017 | Johri | B60W 40/12 |
| 9,726,505 B2 | 8/2017 | Manoliu et al. | |
| 9,849,880 B2* | 12/2017 | D'Amato | B60W 10/04 |
| 10,012,991 B1* | 7/2018 | Ferguson | B62D 15/025 |
| 11,003,182 B2* | 5/2021 | Parchami | B60W 30/085 |
| 2009/0048738 A1* | 2/2009 | Iwazaki | B62D 15/025 |
| | | | 701/44 |
| 2014/0336844 A1* | 11/2014 | Schwindt | B60W 10/184 |
| | | | 701/1 |
| 2015/0266466 A1* | 9/2015 | Johri | B60W 20/10 |
| | | | 701/22 |
| 2017/0080931 A1* | 3/2017 | D'Amato | B60W 30/16 |
| 2017/0247032 A1* | 8/2017 | Lee | B62D 15/025 |
| 2017/0247054 A1* | 8/2017 | Lee | B62D 15/029 |
| 2018/0043931 A1* | 2/2018 | Gupta | B62D 6/005 |
| 2018/0299283 A1* | 10/2018 | Wang | G08G 1/096741 |
| 2019/0187715 A1* | 6/2019 | Zhang | B60W 30/16 |
| 2019/0196487 A1* | 6/2019 | Akiyama | B60W 30/18163 |
| 2019/0210460 A1* | 7/2019 | Mohan | B60K 6/448 |
| 2019/0217858 A1* | 7/2019 | Nath | G05D 1/0212 |
| 2019/0235498 A1* | 8/2019 | Li | B60W 30/00 |
| 2019/0250000 A1* | 8/2019 | Zhang | G05D 1/021 |
| 2019/0317505 A1* | 10/2019 | Li | G01C 21/3407 |
| 2019/0317512 A1* | 10/2019 | Zhang | G05D 1/0238 |
| 2019/0359205 A1* | 11/2019 | Xu | G05D 1/0253 |
| 2019/0391585 A1* | 12/2019 | Zhang | G01C 21/00 |
| 2020/0003564 A1* | 1/2020 | Zhang | G01C 21/32 |
| 2020/0031340 A1* | 1/2020 | Tao | B60W 30/146 |
| 2020/0047752 A1* | 2/2020 | Ivanovic | B60W 30/12 |
| 2020/0097016 A1* | 3/2020 | Zhu | G05D 1/0088 |
| 2020/0124435 A1* | 4/2020 | Edwards | G08G 1/0969 |
| 2020/0139989 A1* | 5/2020 | Xu | B60W 10/04 |
| 2020/0218259 A1* | 7/2020 | Parchami | B60W 60/00186 |
| 2020/0269837 A1* | 8/2020 | Nath | G06K 9/00798 |
| 2020/0285233 A1* | 9/2020 | Hafner | B60W 30/12 |
| 2021/0046977 A1* | 2/2021 | Zhang | B60W 30/06 |
| 2021/0139007 A1* | 5/2021 | Wijffels | G05D 1/0212 |

* cited by examiner

VEHICLE PATH PROCESSING

BACKGROUND

Vehicles can be equipped to operate in both autonomous and occupant piloted mode. Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes to be traveled and objects to be avoided in the vehicle's environment. Safe and efficient operation of the vehicle can depend upon acquiring accurate and timely information regarding routes and objects in a vehicle's environment while the vehicle is being operated on a roadway.

DETAILED DESCRIPTION

Figure 1:
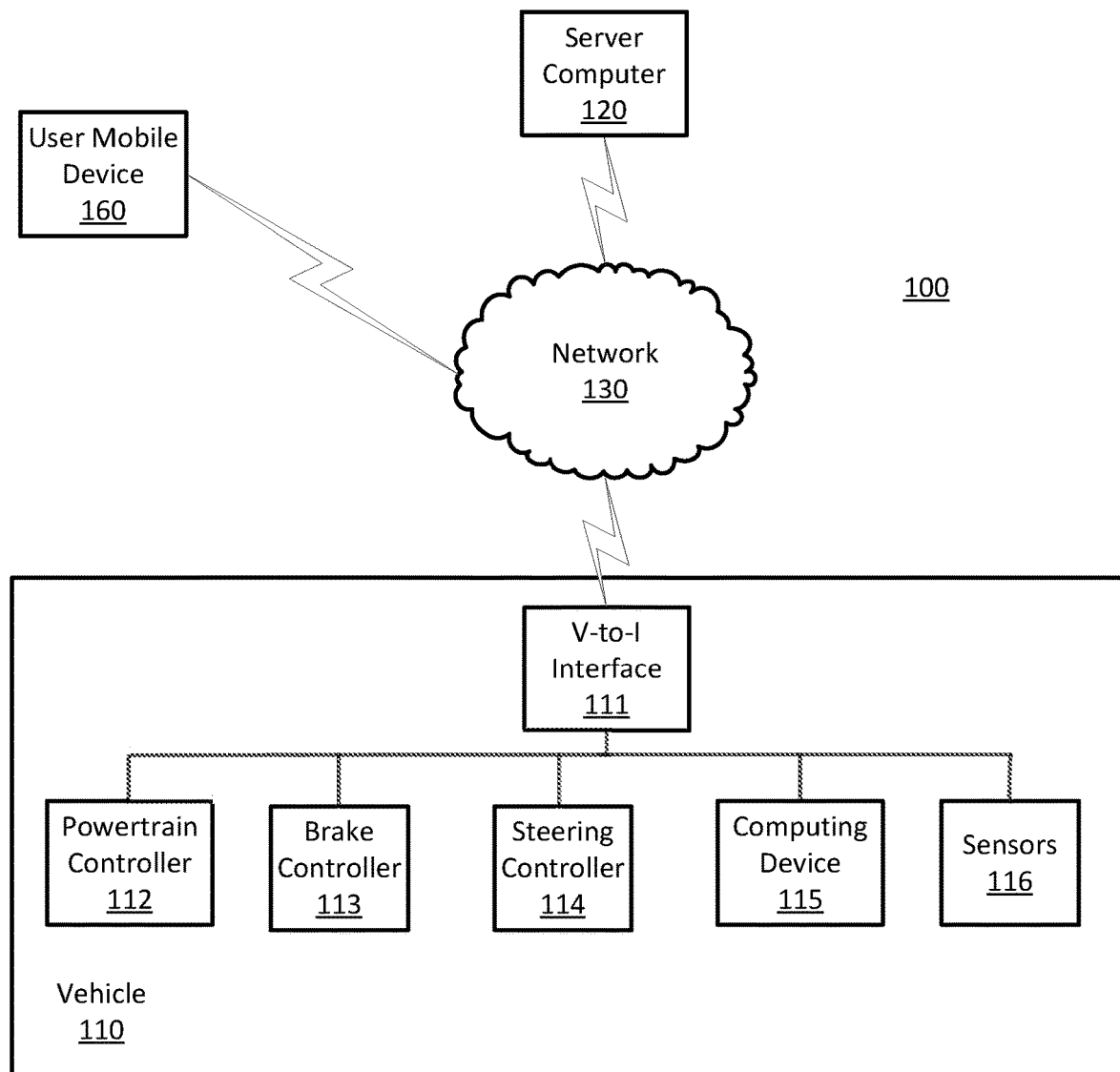
FIG. 1 is a block diagram of an example traffic infrastructure system.

Vehicles can be equipped to operate in both autonomous and occupant piloted mode. By a semi- or fully-autonomous mode, we mean a mode of operation wherein a vehicle can be piloted partly or entirely by a computing device as part of a vehicle information system having sensors and controllers. The vehicle can be occupied or unoccupied, but in either case the vehicle can be partly or completely piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

A computing device in a vehicle can be programmed to acquire sensor data regarding the external environment of a vehicle and to use the sensor data to determine a path polynomial upon which to operate a vehicle based on a vehicle path in autonomous or semi-autonomous mode. A vehicle path is a straight or curved line that describes successive locations (i.e., locations at different times) of a vehicle on a two-dimensional (2D) plane parallel to the surface of a roadway upon which the vehicle operates. A vehicle can operate on a roadway by determining a path polynomial based on a vehicle path. A path polynomial can include path coefficients that determine the relationship between x, a distance measured along and therefore parallel to a vehicle path, and y, a distance measured lateral to and therefore perpendicular to a vehicle path. Based on path coefficients, a computing device can determine instructions to direct vehicle steering components by inputting path coefficients into a steering controller (e.g., electronic control unit or ECU) to operate a vehicle on a roadway. A computing device can determine a path polynomial including path coefficients based on vehicle sensor data and vehicle path information downloaded from a cloud-based server computer via a network.

Disclosed herein is a method, including estimating path coefficients based on a difference between a vehicle location and a vehicle path, including minimizing the difference while controlling path coefficient gain to maintain occupant comfort and safety; and operating a vehicle based on the estimated path coefficients. The estimated path coefficients can include one or more of a lateral distance between the vehicle and the vehicle path, a vehicle steering path heading angle, a steering path curvature, and a steering path curvature rate of change. The estimated path coefficients can be determined based on a recursive least squares estimation technique. The path coefficient gain can be controlled by limiting values of elements of a four-by-four diagonal gain matrix. The vehicle can be operated by inputting path coefficients into a steering controller. Instructions can be determined to direct vehicle steering components based on the path coefficients. Vehicle location can be determined based on vehicle sensor data including GPS sensor data and INS sensor data.

The vehicle path can be determined based on uploading path information from a plurality of vehicles to a server computer. The vehicle path can be downloaded based on the vehicle location. Occupant comfort can be based on determining that vehicle lateral acceleration is less than a first predetermined value and vehicle rate of change of lateral acceleration is less than a second predetermined value. Occupant safety can be based on determining vehicle lateral acceleration is less than a third predetermined value and vehicle rate of change of lateral acceleration is less than a fourth predetermined value. The recursive least squares estimation technique can include iteratively solving an ordinary differential equation to determine estimated path coefficients. The ordinary differential equation can be a time series Lyapunov function.

Further disclosed is a computer readable medium, storing program instructions for executing some or all of the above method steps. Further disclosed is a computer programmed for executing some or all of the above method steps, including a computer apparatus, programmed to estimate path coefficients based on a difference between a vehicle location and a vehicle path, including minimizing the difference while controlling path coefficient gain to maintain occupant comfort and safety; and operate a vehicle based on the estimated path coefficients. The estimated path coefficients can include one or more of a lateral distance between the vehicle and the vehicle path, a vehicle steering path heading angle, a steering path curvature, and a steering path curvature rate of change. The estimated path coefficients can be determined based on a recursive least squares estimation technique. The path coefficient gain can be controlled by limiting values of elements of a four-by-four diagonal gain matrix. The vehicle can be operated by inputting path coefficients into a steering controller. Instructions can be determined to direct vehicle steering components based on the path coefficients. Vehicle location can be determined based on vehicle sensor data including GPS sensor data and INS sensor data.

The computer can be further programmed to determine a vehicle path based on uploading path information from a plurality of vehicles to a server computer. The vehicle path can be downloaded based on the vehicle location. Occupant comfort can be based on determining that vehicle lateral acceleration is less than a first predetermined value and vehicle rate of change of lateral acceleration is less than a second predetermined value. Occupant safety can be based on determining vehicle lateral acceleration is less than a third predetermined value and vehicle rate of change of lateral acceleration is less than a fourth predetermined value. The recursive least squares estimation technique can include iteratively solving an ordinary differential equation to determine estimated path coefficients. The ordinary differential equation can be a time series Lyapunov function.

FIG. 1 is a diagram of a traffic infrastructure system 100 that includes a vehicle 110 operable in autonomous ("autonomous" by itself in this disclosure means "fully autonomous"), semi-autonomous, and occupant piloted (also referred to as non-autonomous) mode. Vehicle 110 also includes one or more computing devices 115 for processing data for piloting the vehicle 110 during autonomous operation. Computing devices 115 can receive information regarding the operation of the vehicle from sensors 116. The computing device 115 may operate the vehicle 110 in an autonomous mode, a semi-autonomous mode, or a non-autonomous mode.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network, e.g., including a bus in the vehicle 110 such as a controller area network (CAN) or the like; the vehicle 110 network can additionally or alternatively include wired or wireless communication mechanisms such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements such as sensors 116 may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, includes hardware, firmware, and software that permits computing device 115 to communicate with a remote server computer 120 via a network 130 such as wireless Internet (Wi-Fi) or cellular networks. V-to-I interface 111 may accordingly include processors, memory, transceivers, etc., configured to utilize various wired and/or wireless networking technologies, e.g., cellular, BLUETOOTH® and wired and/or wireless packet networks. Computing device 115 may be configured for communicating with other vehicles 110 through V-to-I interface 111 using vehicle-to-vehicle (V-to-V) networks, e.g., according to Dedicated Short Range Communications (DSRC) and/or the like, e.g., formed on an ad hoc basis among nearby vehicles 110 or formed through infrastructure-based networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executable by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors (i.e., physical manifestations of vehicle 110 operation) such as speed, acceleration, deceleration, steering, etc., as well as tactical behaviors (i.e., control of operational behaviors typically in a manner intended to achieve safe and efficient traversal of a route) such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113, and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously, for example.

The vehicle 110 is generally a land-based vehicle 110 capable of autonomous and/or semi-autonomous operation and having three or more wheels, e.g., a passenger car, light truck, etc. The vehicle 110 includes one or more sensors 116, the V-to-I interface 111, the computing device 115 and one or more controllers 112, 113, 114. The sensors 116 may collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating, e.g., sensors 116 can detect phenomena such as weather conditions (precipitation, external ambient temperature, etc.), the grade of a road, the location of a road (e.g., using road edges, lane markings, etc.), or locations of target objects such as neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components, and accurate and timely performance of components of the vehicle 110.

Figure 2:
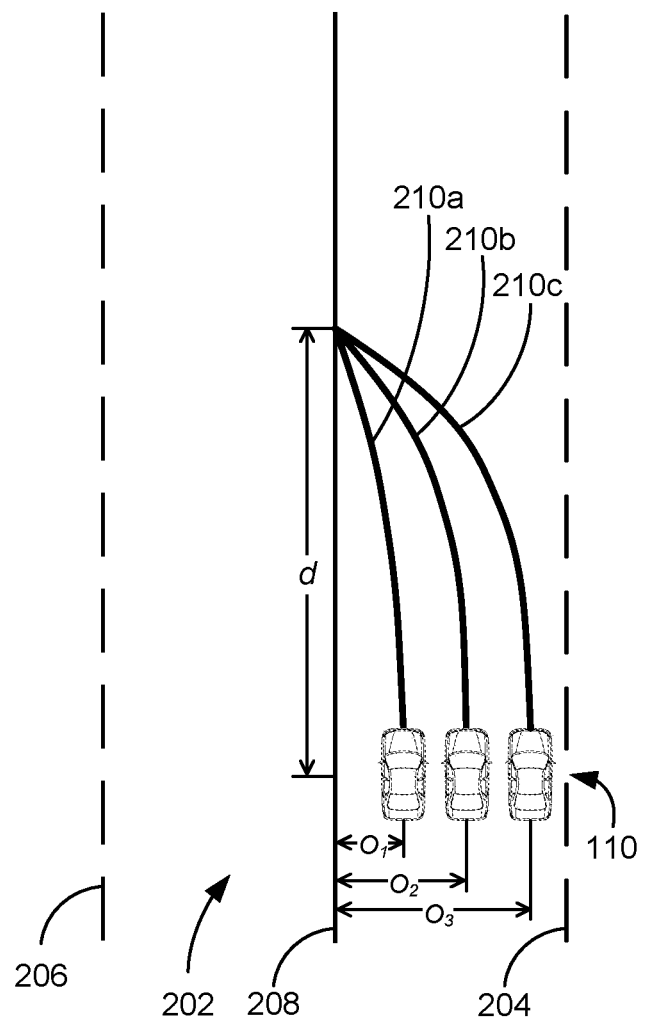
FIG. 2 is a diagram of an example traffic scene.

FIG. 2 is a diagram of a traffic scene 200. Traffic scene 200 is an overhead view of an external environment around a vehicle 110. Traffic scene 200 includes three examples of locations a vehicle 110 could occupy in traffic scene 200. Traffic scene 200 includes a roadway 202 defined by left lane marker 206 and right lane marker 204. Locations of left lane marker 206 and right lane marker 204 with respect to a vehicle 110 can be determined by a computing device 115 in a vehicle 110 using information from vehicle sensors 116. For example, vehicle sensors 116 can include a video sensor and a lidar sensor. Information from a video sensor and/or a lidar sensor can be processed by computing device 115 using machine vision techniques to determine the locations of portions of sensor data corresponding to left lane marker 206 and right lane marker 204 with respect to vehicle 110. For example, a Hough transform can identify straight dashed lines in a field of view of video data or lidar sensor reflectance data. By determining the locations of left lane marker 206 and right lane marker 204 in a sensor 116 field of view, computing device can determine the location of a vehicle 110 with respect to a roadway 202.

Traffic scene 200 also includes a vehicle path 208. Vehicle path 208, as discussed above, is a curved and/or straight line that includes vehicle 110 locations with respect to roadway 202. Vehicle 110 location can be determined with respect to a center of a vehicle 110, which can be defined as the geometric center of a minimally sized rectangle enclosing a 2D outline of a vehicle 110 projected onto a plane parallel to a roadway 202, for example. A computing device 115 in a vehicle 110 can determine the location of vehicle path 208 based on information downloaded from a cloud-based server computer 120 via a network 130. Network 130 can include the Internet and can be accessed via cellular telephone networks and Wi-Fi, for example. Computing device 115 can determine vehicle 110 location with respect to a real-world global coordinate system such as latitude, longitude and altitude based on vehicle sensor 116 data. Based on the location of vehicle 110, server computer 120 can determine a vehicle path 208 to download, which, if followed by vehicle 110, will permit safe and comfortable operation of a vehicle 110, wherein safety and comfort are based on the effect the operation has on an occupant of a vehicle 110.

Determination of safe and comfortable operation can be based on lateral acceleration and rate of change of lateral acceleration. For example, lateral accelerations that approach or exceed 0.5 g of acceleration can be uncomfortable to occupants of a vehicle 110. Very high lateral accelerations, i.e., that approach or exceed 1.0 g of acceleration, can cause a vehicle 110 to skid and/or lose control, thereby risking a collision. Rates of change of lateral accelerations that approach or exceed 0.05 g/s can be felt as a significant sideways "bump" by occupants. Rates of change of lateral accelerations that approach or exceed 0.1 g/s can cause a vehicle 110 to skid and/or lose control and thereby risk a collision.

Server computer 120 can determine that a vehicle path 208 will permit safe and comfortable operation of a vehicle 110 based on analyzing the vehicle path 208 to determine whether operating vehicle 110 on vehicle path 208 at an expected speed would cause vehicle 110 to experience lateral accelerations and rates of change in lateral accelerations greater than the limits listed above. Server computer 120 can determine that the vehicle path 208 data being uploaded corresponds to a safe and comfortable vehicle path 208 by requiring that no portions of a vehicle path 208 would result in excessive lateral accelerations and/or excessive rates of change in lateral acceleration. Server computer 120 can acquire a plurality of safe and comfortable vehicle paths 208 followed by each of a plurality of vehicles 110 traveling on a roadway 202 at various times, and can combine the vehicle paths 208 from respective vehicles 110 to form a single vehicle path 208 to download to a computing device 115 in a vehicle 110 currently traveling on a roadway 202. For example, for roadways 202 having no vehicle path information uploaded, server computer 120 can determine a vehicle path 208 based on map information from a map database like GOOGLE™ maps and image processing techniques to simulate vehicle 110 operation and thereby determine a vehicle path 208. Techniques discussed herein can improve a vehicle path 208 determined based on map information by replacing it with uploaded vehicle paths 208 traveled by vehicles 110.

Vehicle path 208 information can be used by computing device 115 to operate vehicle 110 along vehicle path 208 by determining real world information regarding vehicle 110 location and direction based on vehicle sensor 116 data and comparing it to vehicle path 208 data. Traffic scene 200 also includes path polynomials 210a, 210b, 210c, referred to collectively as path polynomials 210, corresponding to three positions of vehicle 110. Using techniques described below in relation to FIG. 4-9, computing device 115 can determine a path polynomial 210 based on the vehicle path 208 and the location and direction of vehicle 110 with respect to the vehicle path 208. A path polynomial can be expressed as a cubic polynomial:

$$y(x)=a_0+a_1x+a_2x^2+a_3x^3 \qquad (1)$$

wherein y(x) is a lateral distance between the path and a center of a vehicle 110 determined at a displacement x from the origin measured in meters. The vehicle path origin can be defined as the point on a vehicle path 208 closest and perpendicular to the center of a vehicle 110 at the time the path polynomial is determined. The displacement x can be determined over a range d as illustrated in traffic scene 200. The range d determines the rate at which vehicle 110 returns from a location not on a vehicle path 208 to a location on a vehicle path 208 and can be determined based on user input and the speed of vehicle 110, for example.

Path coefficient $\alpha_0$ is the lateral distance between the vehicle path 208 and the center of a vehicle 110 measured in meters. Three values of path coefficient $\alpha_0$ are illustrated in FIG. 2 as lateral distances $O_1$, $O_2$, and $O_3$. Path coefficient $\alpha_1$ is the vehicle steering path heading angle, measured in radians with a heading of zero radians equal to the direction of the vehicle path 208. Steering path heading angle is the direction of the path polynomial 210 at its origin at the center of vehicle 110 compared to the direction of the vehicle path 208. Path coefficient $\alpha_2$ is the path polynomial 210 steering path curvature at its origin at the center of vehicle 110 and is measured in meters$^{-1}$. Path coefficient $\alpha_3$ is the path polynomial 210 steering path curvature rate of change at its origin at the center of vehicle 110 and is measured in meters$^{-2}$. Curvature and rate of curvature change can be measured with respect to either time or distance. In examples where curvature and rate of curvature change are measured in time, vehicle 110 speed can be included in calculations to convert time to distance. In examples where curvature and rate of curvature change are measured in distance, vehicle speed 110 can be included in determining distance d. For example, d can be linearly related to vehicle 110 speed.

Computing device 115 can direct steering controller 114 to control vehicle steering components to operate vehicle 110 along a vehicle path 208 based on path coefficients $\alpha_0$, $a_1$, $a_2$, and $a_3$. When vehicle 110 is operating along a vehicle path 208, path coefficients $\alpha_0$ and $a_1$ will be zero and path coefficients $\alpha_2$ and $a_3$ along with direction will be determined by the vehicle path 208. The real world location of vehicle 110 can be determined by computing device 115 based on vehicle sensors 116 and compared to the predicted location based on path coefficients. While it is desirable that the predicted path polynomial 210 never diverges from the vehicle path 208, in reality vehicle 110 will be subject to perturbations and disturbances caused by the external environment that can affect the motion of vehicle 110 as it operates along a vehicle path 208. A computing device 115 can acquire vehicle 110 location and direction information from vehicle sensors 116 including video sensors, lidar sensors, GPS sensors and inertial navigation system (INS) sensors, for example. Vehicle 110 location and direction information can be processed by computing device 115 as feedback in a closed-loop control process that operates vehicle 110 along vehicle path 208. Computing device 115 can determine an error signal based on an error function that determines differences between the location and direction vehicle 110 and the location and direction of vehicle path 208.

Error functions acquire time series samples of vehicle 110 location and direction and compare them to predicted locations and directions based on vehicle path 208. Error functions can determine error signals based on differences between sampled locations and directions and predicted locations and directions. Error functions can determine output error signals based on filtered input time series data and as a result depend upon continuously differentiable input data to produce reliable results. Discontinuities caused by missing or inaccurate input data can cause error functions to output missing or inaccurate error signals. In the absence of discontinuities, computing device 115 can process an error signal output by an error function and thereby determine control signals to communicate to steering controller 114 to correct the error, e.g. direct steering components of vehicle 110 to make the location and direction of vehicle 110 to be the same as vehicle path 208. For example, computing device 115 can process error signals based on proportional-integral-derivative (PID) control loop feedback such as are commonly used to determine control signals based on input error signals.

PID control processes can determine control signals based on error signals by filtering and combining proportional, integral and derivative error terms based on user input parameters $K_p$, $K_i$, and $K_d$. By changing parameters $K_p$, $K_i$, and $K_d$. and parameters related to filter strength, a PID control process can be "tuned" to determine control signals that can cause vehicle 110 location and direction to remain the same as vehicle path 208 within a user input error limit, as long as the determined error corresponds to a continuous, real function. Mathematically this means that the determined error signal must correspond to a function that is differentiable along its entire length, i.e., that has no discontinuities. Unfortunately, because vehicle sensors 116 can sometimes provide inaccurate information, vehicle 110 can, without warning, be determined by computing device 115 to have a location and direction that creates an error signal that corresponds to a discontinuity. Vehicle sensors 116 can provide inaccurate information because of a sensor 116 malfunction, a loss of lane marking information or a loss of vehicle path 208 information. Because of the discontinuity, a very large, possibly infinite, number of path polynomials 208 can be determined by computing device 115 to return vehicle 110 to traveling on vehicle path 208 from a current location and direction within a distance d.

Figure 3:
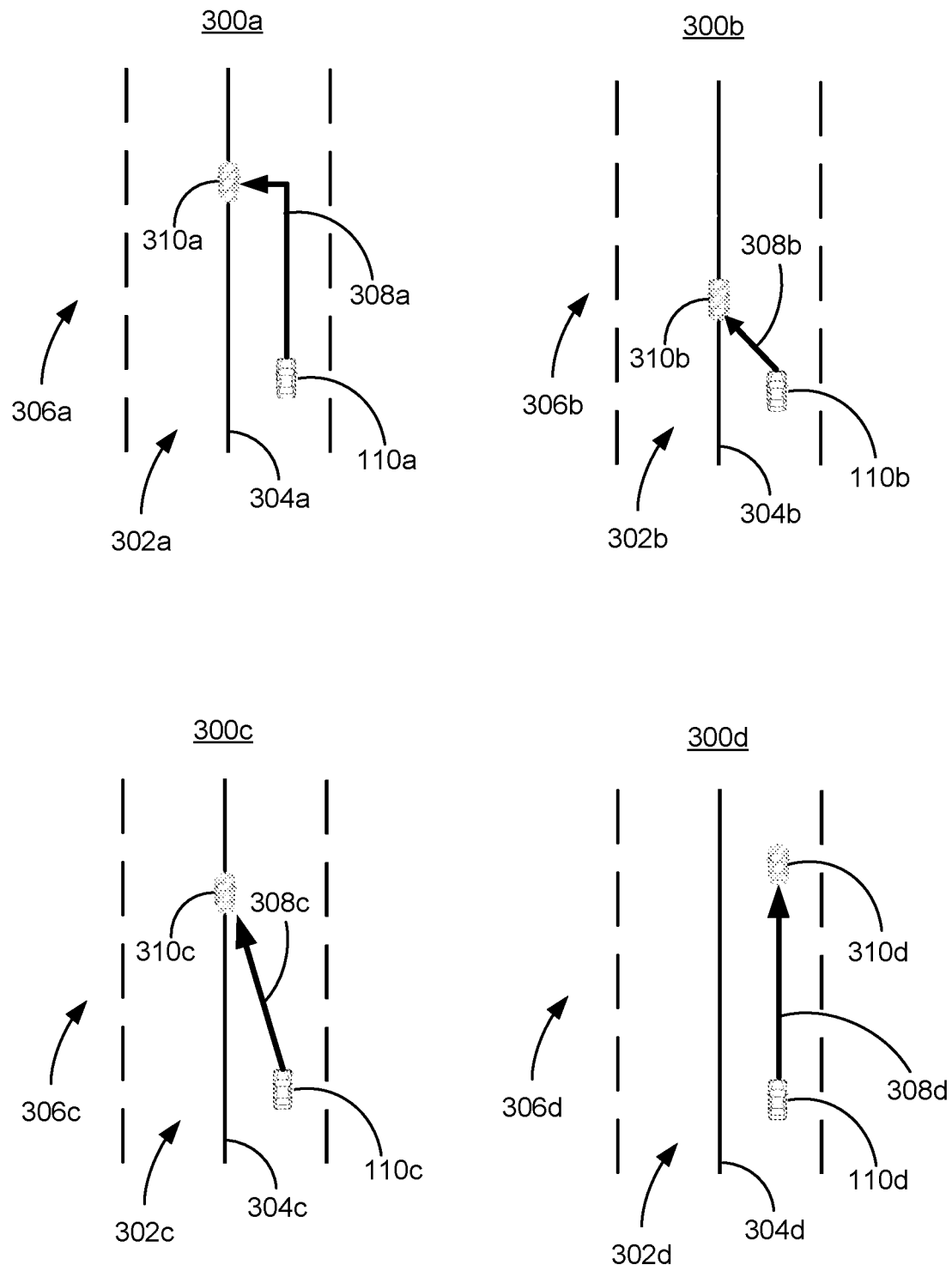
FIG. 3 is another diagram of four example traffic scenes.

FIG. 3 is a diagram of four traffic scenes 300a, 300b, 300c, 300d, referred to collectively herein as traffic scenes 300, illustrating path polynomials 308a, 308b, 308c, 308d, referred to collectively herein as path polynomials 308, generated by computing device 115 based on output from a PID controller in response to a discontinuity in vehicle 110 location. Traffic scenes 300 include roadways 302a, 302b, 302c, 302d, referred to collectively herein as roadways, and vehicles 110a, 110b, 110c, 110d, referred to collectively herein as vehicles 110 operating on roadways 302. A computing device 115 in a vehicle 110 can determine information regarding the location and direct of vehicle 110 with respect to the external environment including roadways 302, lane markers 306a, 306b, 306c, 306d, referred to collectively herein as lane markers 306, and include information regarding locations of vehicle paths 304a, 304b, 304c, 304d, referred to collectively herein as vehicle paths 304 which can be downloaded from a cloud-based server computer 120, for example.

In traffic scenes 300, vehicles 110 are being operated by a computing device 115 along a vehicle path 304 by determining location and direction errors using a PID controller. In traffic scenes 300, vehicles 110 have experienced a loss of information that has caused a change in vehicle 110 location with respect to the vehicle path 304 that results in a discontinuous error function as determined by the PID controller. Because of the discontinuous error function, a PID controller can generate a large number of different possible path polynomials 308 that can be used by computing device 115 to operate a vehicle 110 from a current position to a second position 310*I*, 310*b*, 310*c*, 310*d*, referred to collectively herein as second positions 310. PID controllers can be programmed with different parameters that each yield acceptable vehicle 110 behavior in response to continuous error function data, but which yield differently-shaped path polynomials 308 and hence different vehicle 110 behavior in response to discontinuous error function data. Path polynomials 308 correspond to output from PID controllers each programmed with different parameters.

Each of the path polynomials 308 would result in uncomfortable and/or unsafe operation of vehicle 110 and are therefore unacceptable for operating a vehicle 110. Path polynomial 308*a* will result in an unacceptably high lateral jerk due to the right angle turn that can cause vehicle 110 to skid and/or lose control, for example. Path polynomial 308*b* corresponds to a high rate of lateral acceleration that an occupant of vehicle 110 would find objectionable and/or cause a skid and/or loss of control. Path polynomial 308*c* corresponds to high rates of change in lateral acceleration at the beginning and end of the path polynomial 308*c* that would be unacceptable to an occupant of a vehicle 110. Path polynomial 308*d* never converges on the vehicle path 304*d* and is therefore unacceptable. Attempting to correct vehicle 110 location following a discontinuity based on a PID controller can result in unacceptable vehicle 110 behavior depending upon how the PID controller has been programmed. Techniques disclosed herein determine a steerable path polynomial for a vehicle 110 following a discontinuity that results in two paths, a vehicle path 304 and a path polynomial 308 that needs to converge to the vehicle path 304 in a distance d. A steerable path polynomial 308 is a path polynomial 308 that describes safe and comfortable operation of a vehicle 110, avoiding high lateral accelerations and high rates of change of lateral acceleration.

Figure 4:
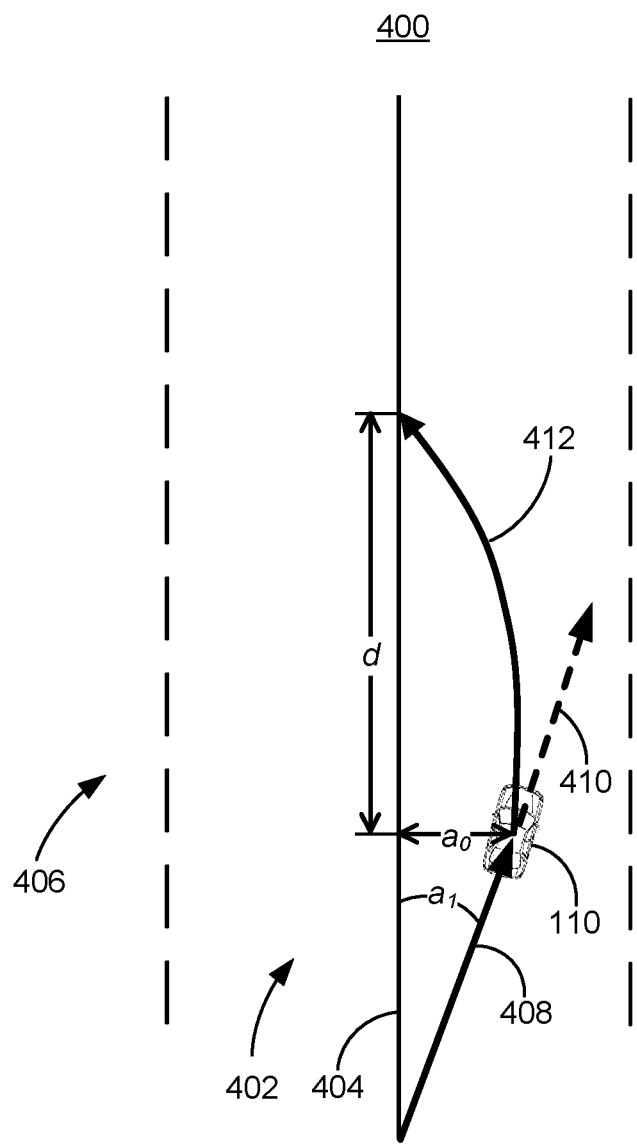
FIG. 4 is another diagram of an example traffic scene.

FIG. 4 is a diagram of a traffic scene 400. Traffic scene 400 includes a vehicle 110, operating on a roadway 402. A computing device 115 in vehicle 110 includes information regarding a vehicle path 404. Vehicle path 404 information can be stored at non-volatile memory included in computing device 115 and/or vehicle path information can be downloaded from a cloud-based server computer 120 via a network 130. Computing device 115 can also include information corresponding to lane markers 406. Information corresponding to lane markers 406 can be acquired from vehicle sensors 116. At the point in time illustrated by traffic scene 400, computing device 115 has determined that a discontinuity has occurred. Discontinuities are determined by determining an error in vehicle 110 location greater than a user input threshold, for example 0.2 meters or detecting a sensor failure lasting longer than 100 milliseconds. Once a discontinuity is determined, any steerable path polynomial currently being used by computing device 115 is invalid and that vehicle 110 is a distance $a_0$ from vehicle path 404 and moving on a path 408 at a heading angle $\alpha_1$ to vehicle path 404. Computing device 115 can determine that a discontinuity has occurred based on sensor failure lasting longer than 100 milliseconds, or deviating from the vehicle path 404 by more than a user input threshold, for example 0.2 meters. At the time the discontinuity is detected, vehicle 110 can be at a distance $a_0$ from vehicle path 404 moving at angle $\alpha_1$ to vehicle path 404 and unless computing device 115 determines new path coefficients, vehicle 110 will coast along path 410.

Techniques described herein permit computing device 115 to determine a time series of path coefficients that define a steerable path polynomial 412 that can be used to operate vehicle 110 from a current path 408 to a vehicle path 404 in a safe and comfortable fashion.

Techniques described herein define an estimator that estimates path coefficients to match a steerable path polynomial beginning at a vehicle 110 operating on a path 408, with a second vehicle path 404 within a distance d despite a discontinuity in an error function calculated based on vehicle 110 position and direction. Note that because techniques described herein do not consider vehicle 110 path history in any calculation, this technique should not be used to correct time-varying errors, for example. Current values of path coefficients $a_0$, $a_1$, $a_2$, and $a_3$ in a path polynomial at the time the discontinuity is detected by computing device 115 can be used as initial values for an estimator, namely $a_0$init, $a_1$init, $a_2$init, and $a_3$init. Third-order path coefficients $a_0$, $a_1$, $a_2$, and $a_3$ can be parameterized as follows:

$$y = [1 \ x \ x^2 \ x^3] \begin{bmatrix} a_0 \\ a_1 \\ a_2 \\ a_3 \end{bmatrix} \tag{2}$$

$$y = W\Theta; \tag{3}$$
$$W = [1 \ x \ x^2 \ x^3];$$

$$\Theta = \begin{bmatrix} a_0 \\ a_1 \\ a_2 \\ a_3 \end{bmatrix}$$

The path estimate $\hat{y}$ is defined as:

$$\hat{y} = W\hat{\Theta} \tag{4}$$

Wherein $\hat{\Theta}$ is the estimate vector for path coefficients. The path estimate can be subtracted from the actual path to obtain the path prediction and estimation error:

$$y - \hat{y} = W(\Theta - \hat{\Theta}) \Rightarrow \tilde{y} = W\tilde{\Theta} \tag{5}$$

Wherein $\tilde{y}$ and $\tilde{\Theta}$ are the prediction errors and estimation errors, respectively. Based on the parameterized model and the error state, an estimator $\dot{\hat{\Theta}}$ can be determined:

$$\dot{\hat{\Theta}} = \alpha \gamma W^T \tilde{y} \tag{6}$$

Wherein $\alpha$ is a scalar estimator gain and $\gamma$ is a four-by-four diagonal gain matrix defined as:

$$\dot{\gamma}^{-1} = 2W^T W \tag{7}$$

Wherein the dot notation means that $\dot{\hat{\Theta}}$ and $\dot{\gamma}^{-1}$ are determined by replacing the right-hand-side of equations (6) and (7) respectively with ordinary differential equations (ODE) based on a time series in each of the elements of W. Because ODE constructed in this fashion can be proven to be everywhere positive, continuous, everywhere differentiable and have the same zero point, the differential equations can be iteratively solved as a time series using a least squares error term $\tilde{y}$ to determine a new gain matrix $\dot{\gamma}$ that will reduce the prediction error $\tilde{y}$ at the next time step.

Defining $\dot{\gamma}$ in this fashion as an ordinary differential equation means that the estimator $\dot{\hat{\Theta}}$ can be determined as a time series Lyapunov function because the elements of W are related by physics, i.e., the elements of W are coefficients of a polynomial function that can be solved to determine a displacement of a point on a plane as a function of time. Lyapunov functions can be solved iteratively, wherein the prediction and estimation errors will go to zero within a finite number of steps. Estimating vehicle path coefficients in this fashion uses a recursive least squares estimation technique, wherein a differential equation based on the estimator in equation (6) is solved based on minimizing a least squares difference between an estimate and a goal, i.e., minimize prediction error $\tilde{y}$ by minimizing a least squares difference between the actual path y and predicted path $\hat{y}$. Lyapunov functions are generally solved with respect to time steps, with the number of steps being a function of scalar estimator gain α. Scalar estimator gain α can be adjusted by a user to yield a desired number of time steps. For example, to determine that a Lyapunov function will converge to a solution in a distance d, the distance d can be converted to time steps by dividing by the vehicle 110 speed and time step size. Because the prediction and estimation errors are defined with respect to a vehicle path 404, converging to zero error means that the steerable path polynomial 412 formed by successive path estimates $\hat{y}$ will converge to a vehicle path 404 in a distance d. When steerable path polynomial 412 converges to vehicle path 404, error function calculation will have recovered from the discontinuity and PID control can be used to provide path coefficients to steering controller 114 based on vehicle path 404.

Computing device 115 can determine that steerable path polynomial 412 corresponds to a safe and comfortable path polynomial by controlling the values of elements included in gain matrix γ. The elements included in gain matrix γ correspond to lateral displacement, lateral movement, lateral acceleration and rate of change of lateral acceleration. By limiting the maximum values of elements of gain matrix γ, lateral acceleration and rate of change of lateral acceleration can be limited to desired levels, thereby insuring safe and comfortable operation of vehicle 110. The maximum level for each element of gain matrix γ can be determined empirically by experimentation with a vehicle 110 or by simulating a vehicle 110 using a simulation via available simulation technology to simulate the behavior of a vehicle 110 on a roadway 402, for example.

Techniques described herein improve operation of a vehicle 110 by providing a solution to problems caused by vehicle sensors 116 temporarily losing data, for example. Temporarily losing sensor 116 data can permit vehicle to travel out of a lane on a roadway unless corrective action is taken. Further, corrective action can cause uncomfortable or unsafe operation of vehicle 110 unless limits on vehicle motion are observed. Techniques described here improve the operation of a vehicle 110 by detecting when a discontinuity in vehicle 110 location data has occurred and determining a steerable path polynomial 412 to match a current vehicle path 408 polynomial with a vehicle path 404 while providing safe and comfortable operation of a vehicle 110.

Figure 5:
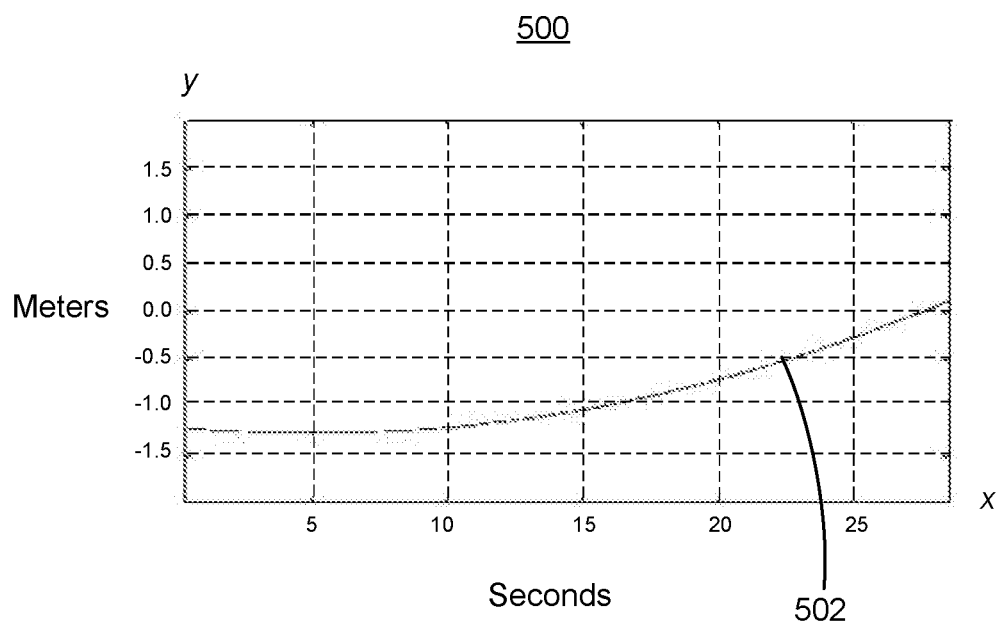
FIG. 5 is a diagram of an example graph of vehicle motion.

FIG. 5 is a diagram of an example graph 500 illustrating a vehicle path 502. Graph 500 graphs vehicle path 502 as a location with respect to a centerline of a roadway 202, 302, 402 on the x-axis in meters versus time in seconds on the y-axis. In this example, the path coefficient vector Θ is set to the initial values $a_0 init=-1.2$ m, $a_1 init=-0.025$ rad, $a_2 init=0.0025$ m$^{-1}$, and $a_3 init=0.0$ m$^{-2}$. Initial values for the estimated path coefficients $\hat{\Theta}$ is set to initial values $a_0 init=-1.0$ m, $a_1 init=+0.025$ rad, $a_2 init=0.0$ m$^{-1}$, and $a_3 init=0.0$ m$^{-2}$. Initial values are estimator gain α=100 and $\gamma^{-1}=10 \cdot I_4$, wherein $I_4$ is a four-by-four identity matrix. Computing device 115 can then determine a time series of path coordinates that can be combined to form a steerable path polynomial 412 that returns a vehicle 110 to vehicle path 502.

Figure 6:
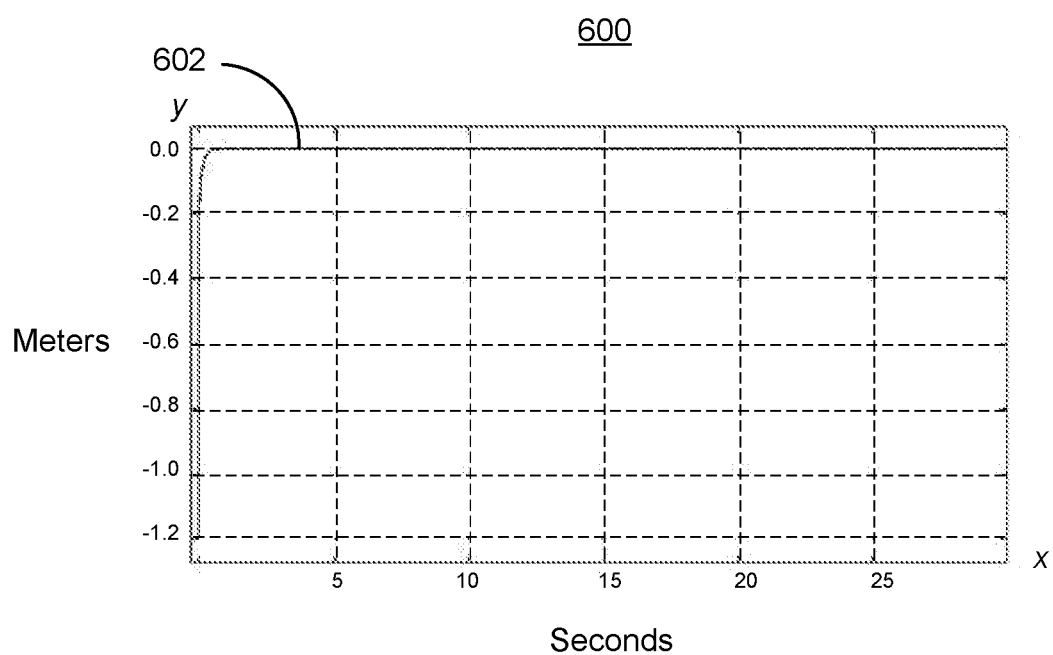
FIG. 6 is a diagram of an example graph of vehicle motion error.

FIG. 6 is a diagram of an example graph 600 illustrating the prediction error $\tilde{y}$ 602 graphed in meters on the x-axis versus seconds on the abscissa. As illustrated in graph 600, prediction error $\tilde{y}$ 602 becomes zero in about 0.4 seconds. This means that the estimated path coefficients determined by the estimator of equation (6) can converged to vehicle path 502 as time increases and distance is covered by the vehicle. As discussed above in relation to FIG. 4., because the estimator is a Lyapunov function, the estimated path coefficients will always converge to the vehicle path 502.

Figure 7:
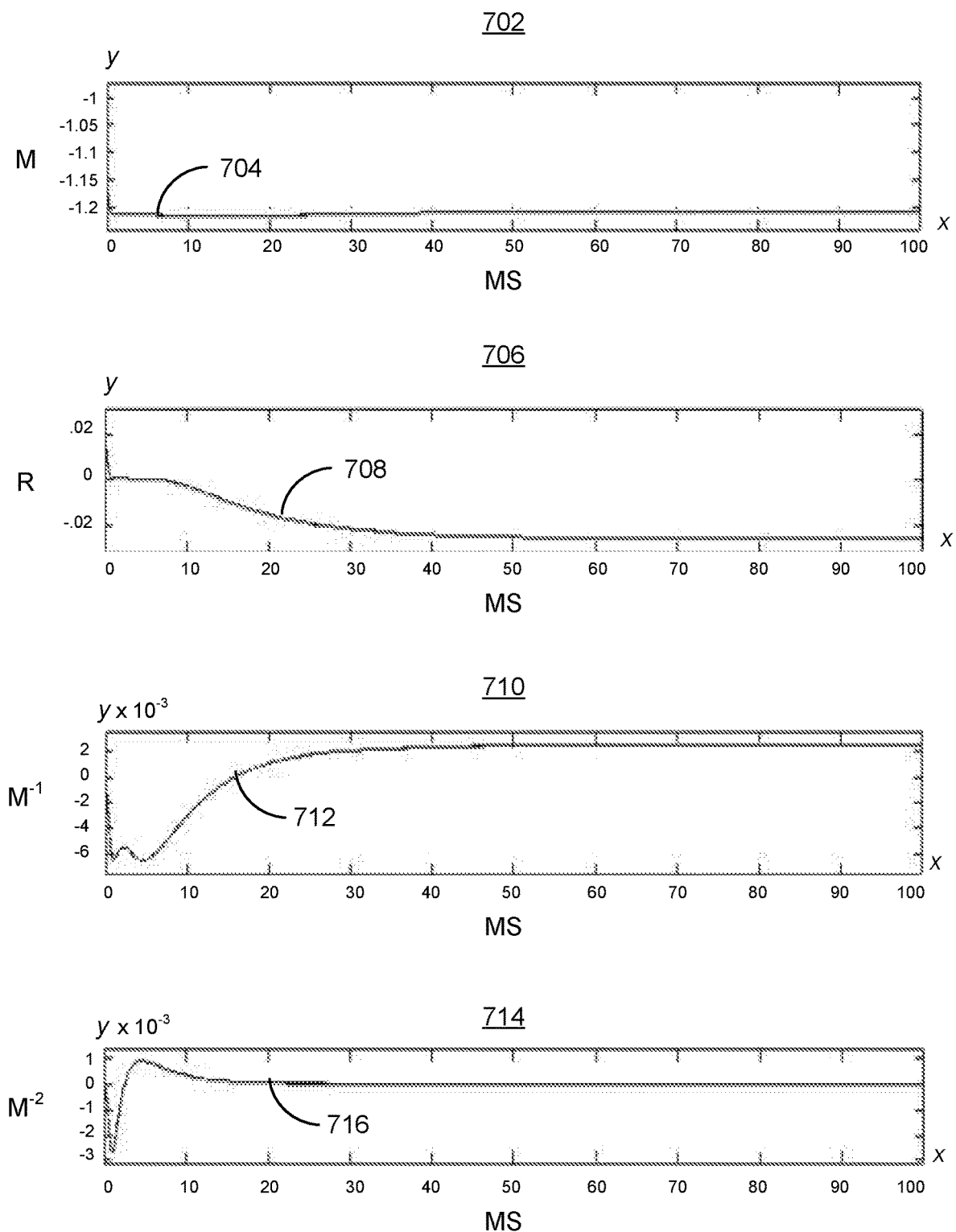
FIG. 7 is a diagram of example graphs of vehicle path polynomial coefficients.

FIG. 7 is a diagram of four example graphs 702, 706, 710, 714 of path coefficients $\alpha_0$ 704, $a_1$ 706, $a_2$ 710, and $a_3$ 714. Graph 702 graphs path coefficient $\alpha_0$ 704 in meters on the x-axis versus milliseconds on the y-axis. Graph 706 graphs path coefficient $\alpha_1$ 708 in radians on the x-axis versus milliseconds on the y-axis. Graph 710 graphs path coefficient $\alpha_2$ 712 in meters$^{-1}$ on the x-axis versus milliseconds on the y-axis, and graph 714 graphs path coefficient $\alpha_3$ 716 in meters$^{-2}$ on the x-axis versus milliseconds on the y-axis. Inspection of graphs 702, 706, 710, 714 reveals that path coefficient values converge to the values of vehicle path 502. Although the convergence time for the individual path coefficients in graphs 702, 706, 710, 714 are greater than the convergence time for path estimation error illustrated in graph 600 of FIG. 6, the estimated path coefficient errors can cancel each other out, providing a nearly zero path estimation error while large individual coefficient errors can exist. Error cancelation is a reason that a recursive least squares error technique based on estimated path coefficients as described herein is a more reliable technique for producing path coefficients following a discontinuity than simply reducing location and direction error.

Figure 8:
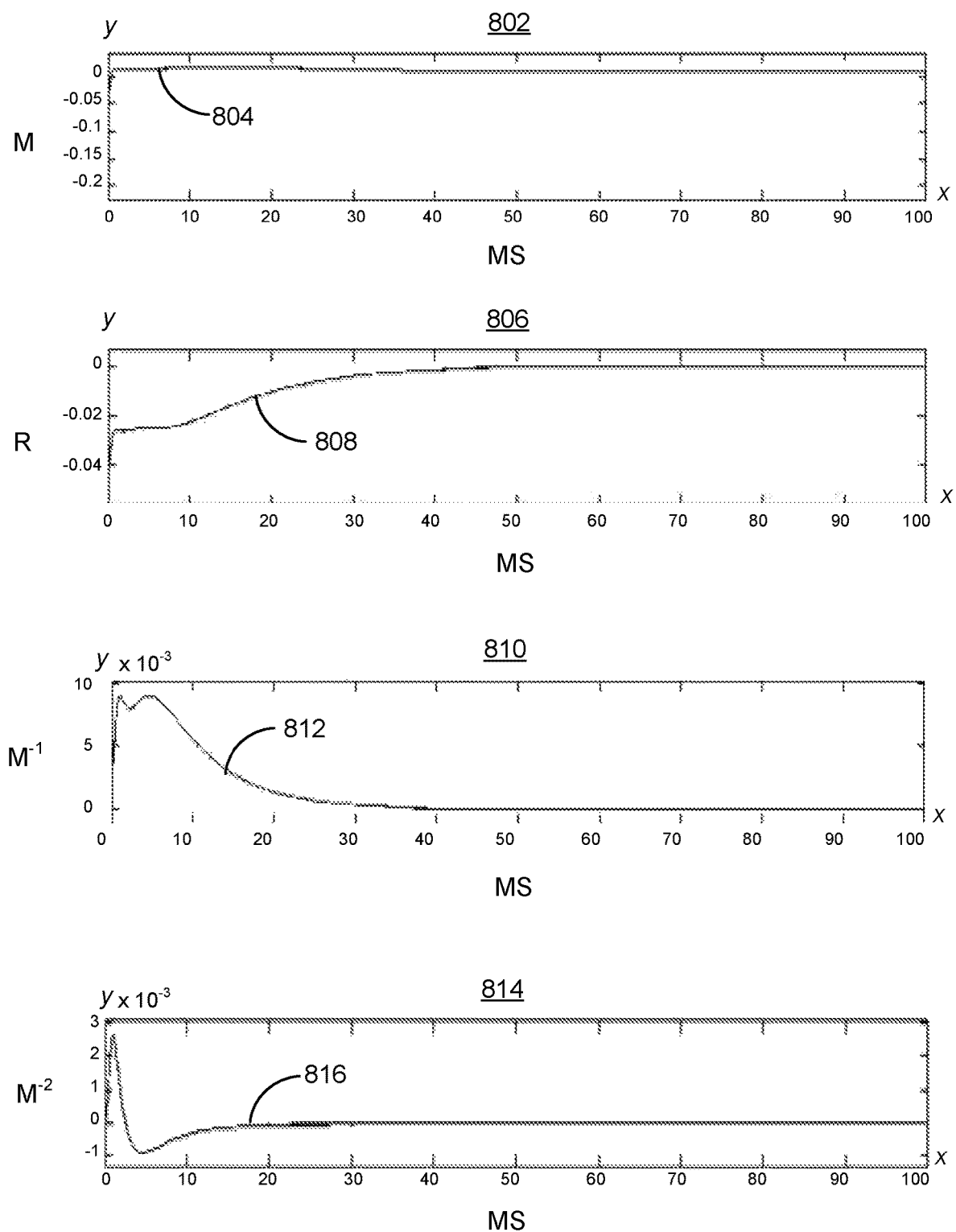
FIG. 8 is a diagram of example graphs of vehicle path polynomial coefficient errors.

FIG. 8 is a diagram of four example graphs 802, 806, 810, 814 of components of path prediction error $\tilde{y}$, namely path coordinate errors $a_0$ error 704, $a_1$ error 708, $a_2$ error 712, and $a_3$ error 716. Graph 802 graphs path coefficient $\alpha_0$ error 704 in meters on the x-axis versus milliseconds on the y-axis. Graph 706 graphs path coefficient $\alpha_1$ error 708 in radians on the x-axis versus milliseconds on the y-axis. Graph 710 graphs path coefficient $\alpha_2$ error 712 in meters$^{-1}$ on the x-axis versus milliseconds on the y-axis, and graph 714 graphs path coefficient $\alpha_3$ error 716 in meters$^{-2}$ on the x-axis versus milliseconds on the y-axis. As can be seen in graphs 802, 806, 810, 814, path coordinates errors all return to zero within a few tens of milliseconds. As can be seen from the data illustrated in graphs 600, 702, 706, 710, 714, 802, 806, 810, 814, an estimator shown in equation (6) can be iteratively solved to determine path coefficients that can be used to operate a vehicle 110 in a safe and comfortable fashion to reach a vehicle path 502.

Figure 9:
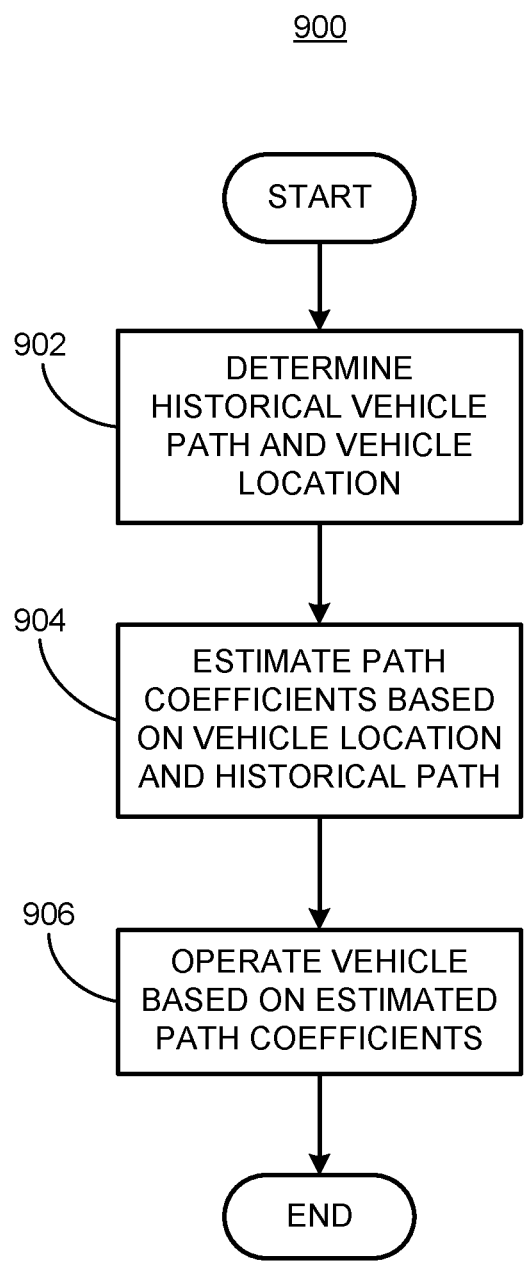
FIG. 9 is a flowchart diagram of a process to operate a vehicle based on estimated path coefficients.

FIG. 9 is a diagram of a flowchart, described in relation to FIGS. 1-8, of a process 900 for operating a vehicle 110 based on estimated path coefficients. Process 900 can be implemented by a processor of computing device 115, taking as input information from sensors 116, and executing commands and sending control signals via controllers 112, 113, 114, for example. Process 900 includes multiple blocks taken in the disclosed order. Process 900 could alternatively or additionally include fewer blocks or can include the blocks taken in different orders.

Process 900 begins at block 902, wherein a computing device 115 in a vehicle determines a vehicle path 404. The vehicle path 404 can be downloaded by computing device 115 from a cloud-based server computer 120 via a network 130. The server computer 120 can determine the vehicle path 404 by uploading vehicle paths 404 from a plurality of vehicles 110 operating on a roadway 402. Server computer 120 can combine a plurality of vehicle paths 404 uploaded by a plurality of vehicles 110 to determine a vehicle path 404 as discussed above in relation to FIG. 2. Server computer can combine information regarding a vehicle 110 location and a vehicle 110 destination to determine which vehicle path 404 to download to vehicle 110, for example. Computing device can store vehicle path 404 at non-volatile memory included in computing device 115 for later use. Computing device 115 can determine a vehicle location using vehicle sensors 116 including GPS and INS.

At block 904 computing device 115 determines that vehicle 110 has experienced a loss of data that includes a discontinuity in a determined error signal. Using vehicle path 404 information and current path 408 as a beginning estimate, computing device 115 can iteratively solve time series ODE to estimate path coefficients that reduce an error term to zero as described above in relation to FIGS. 5-8 and thereby output a steerable path polynomial 412.

At block 906 computing device 115 operates a vehicle 110 by determining signals to input to steering controller 114 to control vehicle steering components based on estimated path coefficients output as steerable path polynomial 412 by estimator. Following block 906 process 900 ends.

Figure 10:
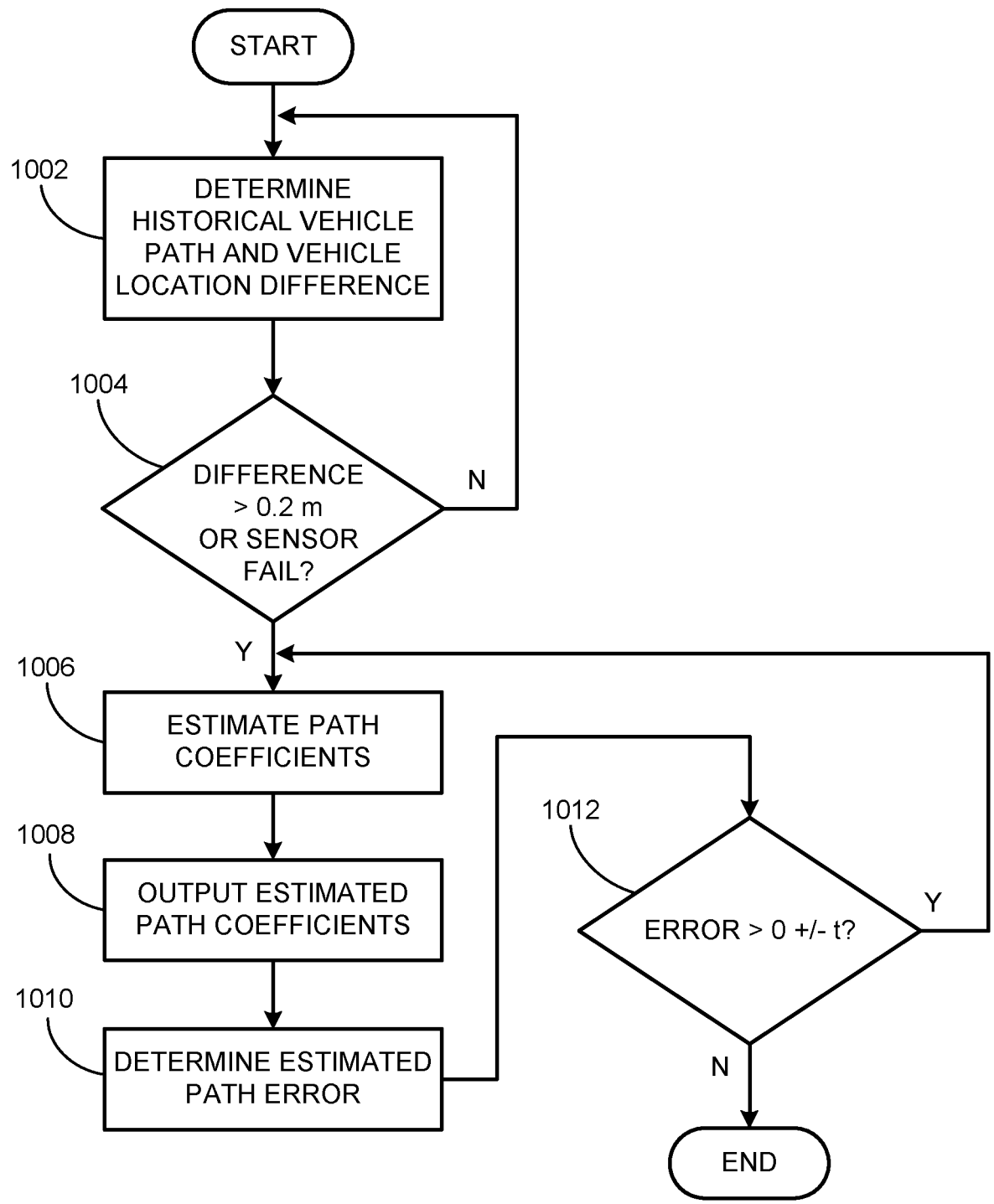
FIG. 10 is a flowchart diagram of a process to estimate path coefficients.

FIG. 10 is a diagram of a flowchart, described in relation to FIGS. 1-8, of a process 1000 for determining estimated path coefficients. Process 1000 can be executed as block in a process such as block 904 in process 900 in FIG. 9. Process 1000 can be implemented by a processor of computing device 115, taking as input information from sensors 116, and executing commands and sending control signals via controllers 112, 113, 114, for example. Process 1000 includes multiple blocks taken in the disclosed order. Process 1000 could alternatively or additionally include fewer blocks or can include the blocks taken in different orders.

Process 1000 begins at block 1002, wherein a least-squares difference is determined between path coefficients corresponding to a vehicle path 404 and path coefficients corresponding to a current path 408.

At block 1004 the least-squares difference is compared to a user input threshold t. If the least-squares difference is greater than 0.2 meters, or if computing device 115 has determined by other means that a sensor 116 has failed, process 1000 passes to block 1006, otherwise process 1000 loops back to block 1002 to determine a new least-squares difference.

At block 1006 computing device 115 determines new estimated path coefficients $\hat{y}$ based on iterative least-squares ODE error minimization as discussed above in relation to FIGS. 5-8.

At block 1008 computing device 115 determines signals to output to steering controller 114 to control vehicle 110 steering components.

At block 1010 computing device 115 can determine an estimated path or prediction error $\tilde{y}$ based on the estimated path coefficients $\hat{y}$ from block 1006 as discussed above in relation to FIGS. 5-8.

At block 1012 computing device 115 test the estimated path or prediction error $\tilde{y}$ to determine if it is equal to zero plus or minus a user input threshold t. If the error is not equal to zero plus or minus a threshold t, process 1000 returns to block 1006 to determine new estimated path coefficients $\hat{y}$. If prediction error $\tilde{y}$ is equal to zero plus or minus a threshold t, process 1000 ends.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exactly described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps or blocks of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A method, comprising:
   estimating path coefficients of a third-degree polynomial equation based on a lateral distance between the vehicle and the vehicle path, a vehicle steering path heading angle, a steering path curvature, and a steering path curvature rate of change, including minimizing the difference while controlling path coefficient gain to maintain occupant comfort and safety;
   determining the estimated path coefficients iteratively using a recursive least squares estimation technique; and
   operating a vehicle based on the estimated path coefficients.

2. The method of claim 1, further comprising controlling the path coefficient gain by limiting values of elements of a four-by-four diagonal gain matrix.

3. The method of claim 2, further comprising replacing the four-by-four diagonal gain matrix with ordinary differential equations based on a time series in each of the elements of the four-by-four diagonal gain matrix.

4. The method of claim 3, further comprising solving the ordinary differential equations iteratively as a time series using a least squares error term to determine a new gain matrix that minimizes a prediction error at each time step.

5. The method of claim 1, further comprising operating the vehicle by inputting path coefficients into a steering controller.

6. The method of claim 5, further comprising determining instructions to direct vehicle steering components based on the path coefficients.

7. The method of claim 1, further comprising determining vehicle location based on vehicle sensor data including global positioning system (GPS) sensor data and inertial navigation system (INS) sensor data.

8. The method of claim 1, further comprising determining the vehicle path based on uploading path information from a plurality of vehicles to a server computer.

9. The method of claim 8, further comprising downloading the vehicle path based on the vehicle location.

10. A system, comprising a processor; and
    a memory, the memory including instructions to be executed by the processor to:
    estimate path coefficients of a third-degree polynomial equation based on a lateral distance between the vehicle and the vehicle path, a vehicle steering path heading angle, a steering path curvature, and a steering path curvature rate of change, including minimizing the difference while controlling path coefficient gain to maintain occupant comfort and safety;
    determine the estimated path coefficients iteratively using a recursive least squares estimation technique; and
    operating a vehicle based on the estimated path coefficients.

11. The system of claim 10, further comprising replacing the four-by-four diagonal gain matrix with ordinary differential equations based on a time series in each of the elements of the four-by-four diagonal gain matrix.

12. The system of claim 11, further comprising solving the ordinary differential equations iteratively as a time series using a least squares error term to determine a new gain matrix that minimizes a prediction error at each time step.

13. The system of claim 10, further comprising controlling the path coefficient gain by limiting values of elements of a four-by-four diagonal gain matrix.

14. The system of claim 10, further comprising operating the vehicle by inputting path coefficients into a steering controller.

15. The system of claim 14, further comprising determining instructions to direct vehicle steering components based on the path coefficients.

16. The system of claim 10, further comprising determining the vehicle location based on vehicle sensor data including global positioning system (GPS) sensor data and inertial navigation system (INS) sensor data.

17. The system of claim 10, further comprising determining the vehicle path based on uploading path information from a plurality of vehicles to a server computer.

18. The system of claim 17, further comprising downloading the vehicle path based on the vehicle location.

19. A system, comprising:
    means for controlling vehicle steering, braking and powertrain; and
    means for:
    estimating path coefficients of a third-degree polynomial equation based on a lateral distance between the vehicle and the vehicle path, a vehicle steering path heading angle, a steering path curvature, and a steering path curvature rate of change, including minimizing the difference while controlling path coefficient gain to maintain occupant comfort and safety;
    determining the estimated path coefficients iteratively using a recursive least squares estimation technique; and
    operating a vehicle based on the estimated path coefficients and the means for controlling vehicle steering, braking and powertrain.

20. The system of claim 19, further comprising replacing the four-by-four diagonal gain matrix with ordinary differential equations based on a time series in each of the elements of the four-by-four diagonal gain matrix.

* * * * *